United States Patent [19]

Hahn et al.

[11] Patent Number: 5,286,854
[45] Date of Patent: Feb. 15, 1994

[54] BASIC AZO DYES WITH A COUPLING COMPONENT OF THE HYDROXYNAPHTHALENECARBOXYLIC ACID SERIES

[75] Inventors: Erwin Hahn, Heidelberg; Heidi Hengelsberg, Mannheim; Udo Mayer, Frankenthal, all of Fed. Rep. of Germany

[73] Assignee: BASF Aktiengesellschaft, Ludwigshafen, Fed. Rep. of Germany

[21] Appl. No.: 998,570

[22] Filed: Dec. 30, 1992

[30] Foreign Application Priority Data

Jan. 30, 1992 [DE] Fed. Rep. of Germany ....... 4202566

[51] Int. Cl.$^5$ ..................... C09B 44/06; C09B 29/15; D06P 1/41
[52] U.S. Cl. .................... 534/603; 534/605; 534/612; 534/615; 534/865; 534/866; 534/867; 8/437; 8/534; 8/654; 8/655; 8/918; 8/919; 8/921
[58] Field of Search ............... 534/603, 605, 612, 615, 534/865, 866, 867; 8/437, 534, 654, 655, 918, 919, 921

[56] References Cited

U.S. PATENT DOCUMENTS 4,652,632 3/1987 Colberg .................... 534/615 X

FOREIGN PATENT DOCUMENTS 0281920 9/1988 European Pat. Off. .

Primary Examiner—Mary C. Lee
Assistant Examiner—Fiona T. Powers
Attorney, Agent, or Firm—Oblon, Spivak, McClelland, Maier & Neustadt

[57] ABSTRACT

Basic azo dyes useful for dyeing or printing polymeric material have the formula

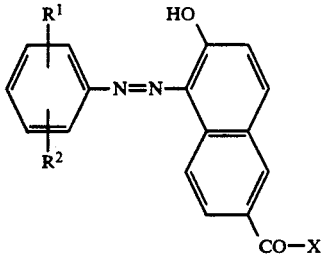

where
$R^1$ is hydrogen, $C_1$-$C_4$-alkyl, $C_1$-$C_4$-alkoxy or $C_1$-$C_4$-alkanoylamino,
$R^2$ is hydrogen, $C_1$-$C_4$-alkyl, $C_1$-$C_4$-alkoxy or a radical of the formula CO-X, and
X is hydroxyl, $C_1$-$C_4$-alkoxy, amino, mono- or di($C_1$-$C_6$-alkyl)amino or a radical of the formula

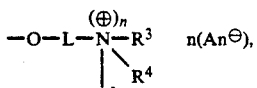

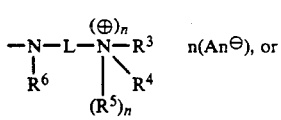

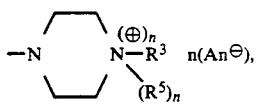

where
n is 0 or 1,
$R^3$, $R^4$ and $R^5$ are hydrogen or substituted or unsubstituted $C_1$-$C_4$-alkyl,
$R^6$ is hydrogen or $C_1$-$C_4$-alkyl,
L is $C_2$-$C_6$-alkylene, and
An$^\ominus$ is one equivalent of an anion, with the proviso that at least one basic or quaternary radical is present in the molecule.

5 Claims, No Drawings

BASIC AZO DYES WITH A COUPLING COMPONENT OF THE HYDROXYNAPHTHALENECARBOXYLIC ACID SERIES

The present invention relates to novel basic azo dyes of the formula I

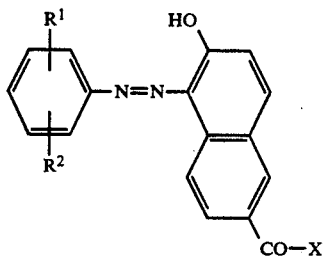

where $R^1$ is hydrogen, $C_1$–$C_4$-alkyl, $C_1$–$C_4$-alkoxy or $C_1$–$C_4$-alkanoylamino, $R^2$ is hydrogen, $C_1$–$C_4$-alkyl, $C_1$–$C_4$-alkoxy or a radical of the formula CO-X, and X is hydroxyl, $C_1$–$C_4$-alkoxy, amino, mono- or di($C_1$–$C_6$-alkyl)amino or a radical of the formula

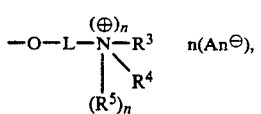

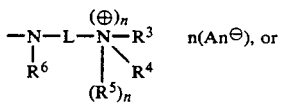

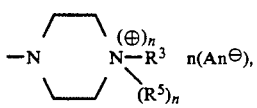

where
n is 0 or 1,
$R^3$, $R^4$ and $R^5$ are identical or different and each is independently of the others hydrogen or unsubstituted or hydroxyl-substituted $C_1$–$C_4$-alkyl,
$R^6$ is hydrogen or $C_1$–$C_4$-alkyl,
L is $C_2$–$C_6$-alkylene, and
$An^\ominus$ is one equivalent of an anion,
with the proviso that at least one basic or quaternary radical is present in the molecule, and to the use thereof for dyeing or printing polymeric material.

it is an object of the present invention to provide novel basic azo dyes having a coupling component of the series of the hdyroxynaphthalenecarboxylic acids. The novel dyes shall be advantageous for dyeing or printing polymeric material, in particular paper. The dyeings obtained shall have good performance characteristics.

We have found that this object is achieved by the basic azo dyes of the formula I defined at the beginning.

Any alkyl and alkylene groups appearing in the abovementioned formulae can be not only straight-chain but also branched.

$R^1$, $R^2$, $R^3$, $R^4$, $R^5$ and $R^6$ are each for example methyl, ethyl, propyl, isopropyl, butyl, isobutyl or sec-butyl.

$R^1$ and $R^2$ and also X may each also be for example methoxy, ethoxy, propoxy, isopropoxy, butoxy, isobutoxy or sec-butoxy.

$R^1$ may also be for example formylamino, acetylamino, propionylamino or butyrylamino.

$R^3$, $R^4$ and $R^5$ may each also be for example 2-hydroxyethyl, 2- 3-hydroxypropyl or 2- or 4-hydroxybutyl.

L is for example —$(CH_2)_2$—, —$(CH_2)_3$—, —$(CH_2)_4$—, —$(CH_2)_5$—, —$CH(CH_3)$—$CH_2$— or —$CH(CH_3)$—$CH(CH_3)$—.

X may also be for example mono- or dimethylamino, mono- or diethylamino, mono- or dipropylamino, mono- or diisopropylamino, mono- or dibutylamino, mono- or dipentylamino, mono- or dihexylamino or N-methyl-N-butylamino.

Suitable anions $An^\ominus$ are for example fluoride, chloride, bromide, iodide, formate, acetate, propionate, mono-, di- or trichloroacetate, lactate, methoxyacetate, citrate, succinate, methylsulfonate, benzenesulfonate and 2- or 4-methylbenzenesulfonate.

A basic or quaternary radical for the purposes of the present invention is a radical of the formula CO-X where X is a radical of the formula

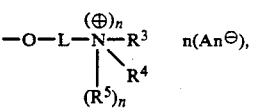

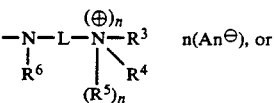

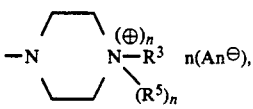

where n, L, $R^3$, $R^4$, $R^5$, $R^6$ and $An^\ominus$ are each as defined above.

Preference is given to basic dyes of the formula I where $R^2$ is a radical of the formula CO-X where X is as defined above.

Particular preference is given to basic dyes of the formula I where $R^2$ is a radical of the formula CO-X where X is a basic or quaternary radical.

Particular preference is also given to basic azo dyes of the formula I where $R^2$ is ortho to the azo bridge.

Particular preference is also given to basic azo dyes of the formula I where $R^1$ is hydrogen.

The novel basic azo dyes of the formula I are obtainable in a conventional manner.

A conventional manner comprises for example diazotizing an aniline of the formula II

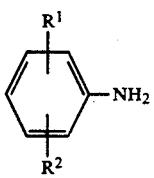

where $R^1$ and $R^2$ are each as defined above, the coupling with a naphthalene derivative of the formula III

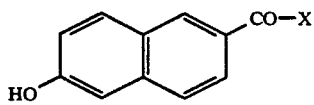

where X is as defined above.

Those dyes of the formula I that contain a quaternary radical (n=1) are conveniently obtained by first preparing the neutral azo dye and then quaternizing it with a $C_2$–$C_4$-alkylene oxide or with a compound of the formula IV $$R^4—Y \qquad (IV)$$

where $R^5$ is unsubstituted or hydroxyl-substituted $C_1$–$C_4$-alkyl and Y is a leaving group, for example chloride, bromide, iodide, methosulfate, ethosulfate, benzenesulfonate or 2-or 4-methylbenzenesulfonate.

The basic azo dyes of the formula I according to the invention can be used alone or mixed with one another or with other cationic or anionic compounds, in the form of solutions, powders or granules. They are advantageous for dyeing or printing polymeric materials, in particular paper stock, but also cellulose, cotton, leather, bast fiber, hemp, flax, sisal, jute, coir or straw.

The dyes can be sued with advantage in the production of pulp colored, sized and unsized paper. They can likewise be used for coloring paper by the dip method.

The coloring/dyeing of paper, leather or cellulose is effected in a conventional manner.

The novel dyes and preparations thereof cause little if any staining of the papermaking waste water, which is particularly favorable for keeping natural water courses clean. They are highly substantive, do not run when applied to paper, and are largely pH insensitive. The dyeings on paper are notable for good light fastness. On prolonged exposure to light the shade changes on-tone.

The dyed paper, which is readily bleachable, is wetfast, not only to water but also to milk, soap solutions, sodium chloride solutions, fruit juices, sweetened mineral water and, owing to their good alcohol fastness, also to alcoholic beverages.

The novel dyes can also be used for dyeing, padding or printing polyacrylonitrile textiles or anionically modified polyamide or polyester textiles.

Embodiments of the invention will now be more particularly described by way of example. Percentages are by weight.

EXAMPLE 1

109.4 g of a 58.9% aqueous solution of 2-(dimethylamino)ethyl anthranilate were dissolved in a mixture of 127 g of 30% hydrochloric acid and 101.6 g of glacial acetic acid at from 10° to 15° C. and then 69.1 g of 32% aqueous sodium nitrite solution were added dropwise. After about 1 hour excess nitrite was destroyed with amidosulfuric acid. To the diazonium chloride solution were then added alternate portions of 197.6 g of 30% aqueous sodium acetate solution and 61.6 g of methyl 2-hydroxy-6-naphthoate, and the temperature rose to 30° C. On completion of the addition the reaction mixture was brought to a pH of 7, and the resulting precipitate was filtered off, washed with water and dried to leave 106.7 g of an orange powder of the formula

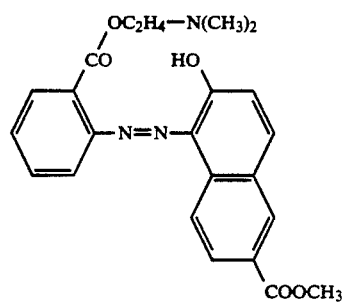

The dye can be dissolved with glacial acetic acid and water to form a stable 26% strength liquid formulation. On paper stock it produces a brilliant yellowish orange hue. The waste water is virtually colorless. The bleachability with sodium dithionite is very good.

EXAMPLE 2

7.1 g of a 58.9% aqueous solution of 2-(dimethylamino)ethyl anthranilate were diazotized as described in Example 1. Then alternate portions of 12.8 g of 30% aqueous sodium acetate solution and 5.2 g of N-[2-(dimethylamino)ethyl]-2-hydroxy-6-naphthamide were added to the reaction solution. On completion of the addition the solution was stirred at room temperature for 1 hour and at 40° C. for a further 2 hours. The solution containing the dye of the formula

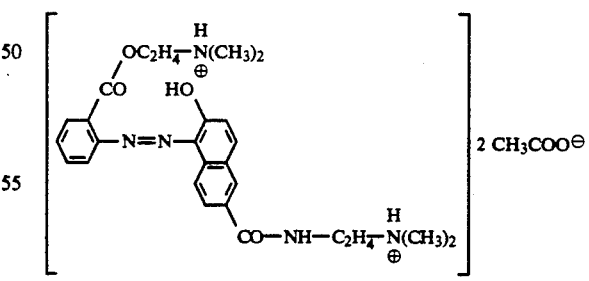

was then filtered and used directly for dyeing paper ($\lambda_{max}$ (acetic acid): 309.1, 482.1 nm). The dyeings on paper are yellowish orange. The waste water contains little color. With sodium dithionite the dyeing on the paper is virtually completely decolorizable.

The same method can be used to obtain the dyes listed below in Tables 1 and 2.

TABLE 1

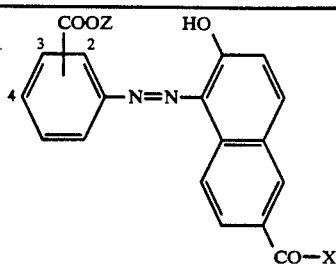

| Ex. No. | Ring position of COOZ | Z | X | mp. [°C.] $\lambda_{max}$ [nm, in glacial acetic acid] Hue |
|---|---|---|---|---|
| 3 | 2 | $(CH_3)_2N-C_2H_4$ | $CH_3O$ | 149° C./ orange |
| 4 | 2 | $(CH_3)_2N-C_2H_4$ | $(CH_3)_2N-C_2H_4O$ | 314.1, 482.1 nm/ orange |
| 5 | 2 | $(CH_3)_2N-C_2H_4$ | $(C_2H_5)_2N-C_2H_4-NH$ | 309.1, 482.1 nm/ orange |
| 6 | 2 | $(CH_3)_2N-C_2H_4$ | $(CH_3)_2N-C_2H_4-NH$ | 309.1, 482.1 nm/ orange |
| 7 | 2 | $(CH_3)_2N-C_2H_4$ | $C_2H_5O$ | 149-151° C./ orange |
| 8 | 2 | $(CH_3)_2N-C_2H_4$ | HO | 194-196° C./ orange |
| 9 | 2 | $(CH_3)_2N-C_2H_4$ | $n-C_3H_7NH$ | 135-137° C./ orange |
| 10 | 2 | $(CH_3)_2N-C_2H_4$ | $n-C_4H_9NH$ | 148-150° C./ orange |
| 11 | 2 | $(CH_3)_2N-C_2H_4$ | $n-C_6H_{13}NH$ | 95-98° C./ orange |
| 12 | 3 | $(CH_3)_2N-C_2H_4$ | $(CH_3)_2N-C_2H_4-NH$ | orange |
| 13 | 4 | $(CH_3)_2N-C_2H_4$ | $(CH_3)_2N-C_2H_4-NH$ | orange |
| 14 | 3 | $(CH_3)_2N-C_2H_4$ | $(CH_3)_2N-C_2H_4O$ | orange |
| 15 | 4 | $(CH_3)_2N-C_2H_4$ | $(CH_3)_2N-C_2H_4O$ | orange |

TABLE 2

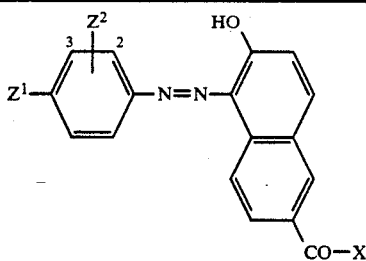

| Ex. No. | $Z^1$ | $Z^2$ | X | mp. [°C.] Hue |
|---|---|---|---|---|
| *16 | $CH_3O$ | H | $(CH_3)_2N-C_2H_4-NH$ | 129-130° C./red |
| 17 | $CH_3CO-NH$ | H | $(CH_3)_2N-C_2H_4-NH$ | 207-209° C./red |
| 18 | $CH_3O$ | H | $(CH_3)_2N-C_2H_4O$ | 116-117° C./red |
| 19 | H | H | $(CH_3)_2N-C_2H_4-NH$ | yellowish orange |
| 20 | $CH_3$ | H | $(CH_3)_2N-C_2H_4-NH$ | yellowish orange |
| 21 | $C_2H_5O$ | H | $(CH_3)_2N-C_2H_4-NH$ | red |
| 22 | $CH_3CO-NH$ | H | $(CH_3)_2N-C_2H_4O$ | red |
| 23 | H | H | $(CH_3)_2N-C_2H_4O$ | yellowish orange |
| 24 | $CH_3$ | H | $(CH_3)_2N-C_2H_4O$ | yellowish orange |
| 25 | $C_2H_5O$ | H | $(CH_3)_2N-C_2H_4O$ | yellowish orange |
| 26 | $CH_3O$ | $2-CH_3O$ | $(CH_3)_2N-C_2H_4-NH$ | red |
| 27 | $CH_3$ | $3-CH_3$ | $(CH_3)_2N-C_2H_4-NH$ | orange |
| 28 | $CH_3$ | $2-CH_3O$ | $(CH_3)_2N-C_2H_4-NH$ | orange |
| 29 | $CH_3O$ | $2-CH_3O$ | $(CH_3)_2N-C_2H_4O$ | red |
| 30 | $CH_3$ | $3-CH_3$ | $(CH_3)_2N-C_2H_4O$ | orange |
| 31 | $CH_3$ | $2-CH_3O$ | $(CH_3)_2N-C_2H_4O$ | orange |
| 32 | H | $2-CH_3$ | $(CH_3)_2N-C_2H_4O$ | orange |
| 33 | H | $2-CH_3O$ | $(CH_3)_2N-C_2H_4O$ | orange |
| 34 | H | $2-C_2H_5O$ | $(CH_3)_2N-C_2H_4O$ | orange |
| 35 | H | $2-C_2H_5O$ | $(CH_3)_2N-C_2H_4-NH$ | orange |
| 36 | H | $2-CH_3$ | $(CH_3)_2N-C_2H_4-NH$ | orange |

EXAMPLE 37 (USE)

To a 30° SR aqueous pulp suspension comprising 70 g of bleached pine sulfate pulp and 30 g of bleached birch sulfate pulp, density 2.5%, was added 0.8 g (based on dry matter) of the dye of Example 1 in the form of a 0.5% aqueous solution acidified with acetic acid, and the mixture was homogenized by stirring for 15 minutes. Then the pulp was diluted to a density of 0.2% with tap water and used to form a sheet of paper on a sheet former in a conventional manner. The waste water was virtually colorless. The sheet of paper obtained had a brilliant yellowish orange color and was very readily bleachable with sodium dithionite.

EXAMPLE 38 (USE)

The procedure was initially as described in Example 33, except that 1% of resin size and 3% of alum were added 10 minutes after the addition of the aqueous acetic acid solution of the dye of Example 1. The pulp suspension was then stirred for a further 5 minutes and then thereafter diluted with water (adjusted with sulfuric acid to pH 5) to a pulp density of 0.2%. Sheets of paper were produced therefrom in a conventional manner. These sheets had a brilliant yellowish orange color and were very readily bleachable with sodium dithionite. The waste water was almost colorless.

EXAMPLE 39 (USE)

70 g of groundwood and 30 g of half-bleached sulfate pulp were dyed with an aqueous acetic acid solution of a dye of Example 1 as described in Example 34. The sheets of paper obtained had a brilliant yellowish orange color and were very readily bleachable with sodium dithionite. The waste water was virtually colorless.

EXAMPLE 40 (USE)

70 g of groundwood and 30 g of half-bleached sulfate pulp were treated with 20% of kaolin (based on groundwood and sulfate pulp), dyed with an acetic acid solution of the dye of Example 1 as described in Example 38, and then sized, again as described in Example 38. Paper produced from this material in a conventional manner had a brilliant yellowish orange color and was virtually completely decolorizable with sodium dithionite. The waste water was colorless.

We claim:

1. A basic azo dye of the formula I

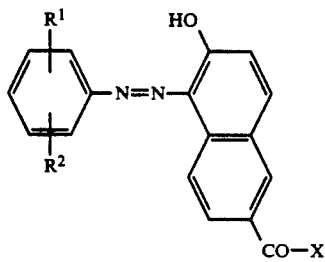

where
$R^1$ is hydrogen, $C_1$-$C_4$-alkyl, $C_1$-$C_4$-alkoxy or $C_1$-$C_4$-alkanoylamino,
$R^2$ is hydrogen, $C_1$-$C_4$-alkyl, $C_1$-$C_4$-alkoxy or a radical of the formula CO-X, and
X is hydroxyl, $C_1$-$C_4$-alkoxy, amino, mono- or di($C_1$-$C_6$-alkyl)amino or a radical of the formula

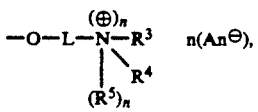

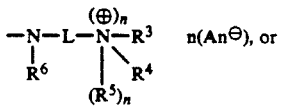

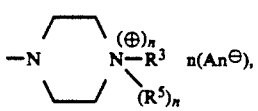

where
n is 0 or 1,
$R^3$, $R^4$ and $R^5$ are identical or different and each is independently of the others hydrogen or unsubstituted or hydroxyl-substituted $C_1$-$C_4$-alkyl,
$R^6$ is hydrogen or $C_1$-$C_4$-alkyl,
L is $C_2$-$C_6$-alkylene, and
An$^\ominus$ is one equivalent of an anion,
with the proviso that at least one basic or quaternary radical is present in the molecule.

2. A basic dye as claimed in claim 1 wherein $R^2$ is a radical of the formula CO-X where X is as defined in claim 1.

3. A basic dye as claimed in claim 1 wherein $R^2$ is a radical of the formula CO-X where X is a basic or quaternary radical.

4. A basic dye as claimed in claim 1 wherein $R^2$ is ortho to the azo bridge.

5. A method of dyeing or printing polymeric material which comprises applying thereto a basic dye according to claim 1.

* * * * *